(12) United States Patent
Yang

(10) Patent No.: US 6,198,821 B1
(45) Date of Patent: Mar. 6, 2001

(54) EARPHONE-MICROPHONE ADAPTER

(75) Inventor: Bill Yang, Taipei (TW)

(73) Assignee: Cotron Corporation, Taipei (TW)

( * ) Notice: Subject to any disclaimer, the term of this patent is extended or adjusted under 35 U.S.C. 154(b) by 0 days.

(21) Appl. No.: 09/267,758

(22) Filed: Mar. 11, 1999

(30) Foreign Application Priority Data

Jul. 21, 1998 (TW) ................................. 87211793

(51) Int. Cl.7 ................................................... H04M 1/00
(52) U.S. Cl. ........................................... 379/420; 379/430
(58) Field of Search .................................. 379/420, 430; 455/575, 90; 381/74, 370, 376, 381

(56) References Cited

U.S. PATENT DOCUMENTS 6,122,369 * 9/2000 Hwang et al. ....................... 379/420

* cited by examiner

*Primary Examiner*—Jack Chiang
(74) *Attorney, Agent, or Firm*—Jiawei Huang; J.C. Patents

(57) ABSTRACT

An adapter for connecting an earphone-microphone set to a mobile telephone such that a muting function is added to the system. Moreover, an older earphone-microphone set can also be connected to a mobile telephone via this adapter.

18 Claims, 8 Drawing Sheets

EARPHONE-MICROPHONE ADAPTER

CROSS-REFERENCE TO RELATED APPLICATION

This application claims the priority benefit of Taiwan application serial no. 87211793, filed Jul. 21, 1998, the full disclosure of which is incorporated herein by reference.

BACKGROUND OF THE INVENTION

1. Field of Invention

The present invention relates to an adapter. More particularly, the present invention relates that act as a link between an earphone-microphone and a mobile telephone.

2. Description of Related Art

As wireless communication continues to develop and semiconductor fabrication techniques continue to improve, mobile telephones are becoming more lightweight, compact and multi-functional. In fact, the mobile telephone has become a piece of indispensable communication equipment in our daily lives. However, in some situations, holding a mobile telephone with a hand is inconvenient or even dangerous. For example, using a hand to reach for a mobile telephone while driving a car can be quite hazardous. Therefore, most mobile telephones have a socket for connecting to an external earphone-microphone set.

FIG. 1A is a schematic drawing of a conventional earphone-microphone set and a mobile telephone. FIG. 1B is a circuit diagram showing the electrical connection within the earphone-microphone set as shown in FIG. 1A.

As shown in FIGS. 1A and 1B, the earphone-microphone set 100 comprises an earphone 120, a microphone 130 and a plug 110. The plug is a plug containing three terminals 111, 112 and 113. One end of the microphone 130 is connected to the terminal 111 of plug 110, while the other end of the microphone 130 is connected to the terminal 112 of plug 110. The plug 110 is made to fit into the socket 13 of a mobile telephone 10. The socket 13 has internal contacting points (not shown in the Fig.) for connecting with the three corresponding terminals of the plug 110. Therefore, when the plug 110 is plugged into the socket 13, the earphone 120 and microphone 130 are connected to the internal circuit of the mobile telephone 10.

When the earphone-microphone set needs to be used, the user can put the earphone 120 onto one's ear. The microphone 130 is specially positioned so that it is close to the user's mouth when the earphone is plugged into the ear. Hence, the user can use the mobile phone without having to hold it with a hand.

Although the aforementioned conventional earphone-microphone set 100 can provide mobile telephone user with much convenience and safety, the mobile telephone is usually placed somewhere out of sight. For example, most users wear their mobile telephone around their waists. Hence, when there is an incoming call, the user has to grope for the buttons on the telephone panel, and press the correct button before being able to receive the call. This method of receiving calls causes great inconveniences, especially when the user is driving a car, because a user must divert his or her gaze to look for the mobile phone. Consequently, mobile telephone manufacturers have decided to add new functions to the conventional earphone-microphone set.

FIG. 2A is a sketch of a newer version of conventional earphone-microphone set and a mobile telephone. FIG. 2B is a circuit diagram showing electrical connection within the earphone-microphone set as shown in FIG. 2A.

As shown in FIGS. 2A and 2B, the microphone 200 similarly has an earphone 220, a microphone 230 and a plug 210. However, an additional call-receiving switch 240 is also installed at a convenient location for picking up incoming calls so that a four-terminal plug 210 is used. The plug 210 has four terminals including 211, 212, 213 and 214. Connection of the terminals to the earphone and microphone is very similar to the aforementioned earphone-microphone set 100 in FIGS. 1A and 1B.

In other words, the two ends of the microphone 230 are connected to the terminals 211 and 213 of the plug 210, respectively. The two ends of the earphone 220 are connected to terminal 212 and terminal 213 of the plug 210, respectively. The two ends of the call-receiving switch 240 are connected to the terminal 213 and the extra terminal 214 of the plug 210, respectively. The plug 210 can be plugged into the socket 23 of a mobile telephone 20. After the plug 210 is plugged into the socket 23, the four terminals of the plug 210 are connected to the corresponding internal contacting points (not shown) within the mobile telephone 20.

Hence, the earphone 220 and the microphone 230 are both connected to the internal circuit of the telephone 20. The mobile telephone 20 has special circuit for detecting any change of state in the switch 240 connected in parallel between terminals 213 and 214. If the user flips the switch 240 from open to close position, this reflects the user's needs to pick up an incoming call.

Although the second conventional earphone-microphone set 200 is able to pick up incoming calls with ease, the set 200 still does not have a muting function. Therefore, some inconvenience still exists in operation. For example, when a user is communicating with a second person at the other end of a mobile telephone, and if the user also wants to discuss private or confidential matters with a third person nearby and does not want their conversation to be overheard by the second person, the user has to take the earphone-microphone set off the ear and leave it in a far away place.

When the user has finished discussion with the third party, the user has to fetch the earphone-microphone set and put it back on. Moreover, even if the earphone-microphone set is far away from the user, the highly sensitive microphone can still pick up some signals and broadcast to the other side of the mobile telephone. Furthermore, the older type of earphone-microphone set cannot be re-used. If the new call-receiving function on the earphone-microphone set is required, one has to purchase the entire earphone-microphone set. Consequently, not only is money wasted, but the old earphone-microphone sets are also wasted, too.

Hence, in summary, the two types of conventional earphone-microphone sets have the following drawbacks:

1. Without a muting function, using the mobile telephone is inconvenient. It is difficult to prevent the other party on the other side of the mobile telephone to overhear private conversation.
2. Newer functions cannot be added to the old earphone-microphone set. Consequently, a complete earphone-microphone set must to be purchased, and the old earphone-microphone set has to be thrown away. This is a waste of the user's money and resources.

In light of the foregoing, there is a need to provide an adapter for improving the earphone-microphone set operation.

SUMMARY OF THE INVENTION

Accordingly, the present invention is to provide an earphone-microphone adapter that links an earphone-microphone set with a mobile telephone. The adapter has a call-receiving switch for receiving incoming calls and a muting switch for mute operation of the earphone-microphone set. Moreover, old earphone-microphone sets can also be re-used by plugging the old set into one end of the adapter.

To achieve these and other advantages and in accordance with the purpose of the invention, as embodied and broadly described herein, the invention provides an adapter for connecting an earphone-microphone set to a mobile telephone. The earphone-microphone set comprises an earphone, a microphone and a first plug, wherein the plug has a first, a second and a third terminal. The microphone is connected between the first terminal and the third terminal of the first plug, whereas the earphone is connected between the second terminal and the third terminal of the first plug.

The adapter includes a second plug, a socket, a muting switch and a call-receiving switch. The second plug has four terminals including a first, a second, a third and a fourth terminal for connecting with the mobile telephone. The socket has a first contact point, a second contact point and a third contact point. The second contact point is connected to the second terminal of the second plug, and the third contact point is connected to the third terminal of the second plug. The socket is for engaging with the first plug of the earphone-microphone set. When the first socket is plugged into the socket, the first contact point, the second contact point and the third contact point of the socket are in contact with the first terminal, the second terminal and the third terminal of the first plug respectively.

One end of the muting switch is connected to the first terminal of the second plug, while the other end of the muting switch is connected to the first contact point of the socket. After the earphone-microphone set is connected to the mobile telephone via the adapter, the muting switch is also hooked up. When the muting switch is activated, connection of the microphone to the mobile telephone is cut off.

One end of the call-receiving switch is connected to the third terminal of the second plug, while the other end of the call-receiving switch is connected to the fourth terminal of the second plug. After the earphone-microphone set is connected to the mobile telephone via the adapter, any incoming calls can be picked up by briefly pressing the call-receiving switch.

In another aspect, this invention provides an adapter for connecting an earphone-microphone set to another type of mobile telephone. The earphone-microphone set comprises a earphone, a microphone and a first plug, wherein the first plug has three terminals including a first terminal, a second terminal and a third terminal. One end of the microphone is connected to the first terminal of the first plug, while the other end of the microphone is connected to the third terminal of the first plug. One end of the earphone is connected to the second terminal of the first plug, while the other end of the earphone is connected to the third terminal of the first plug.

The adapter includes a second plug, a socket, a muting switch and a call-receiving switch. The second plug has three terminals including a first, a second and a third terminal for connecting with the mobile telephone. The socket has a first contact point, a second contact point and a third contact point. The second contact point is connected to the second terminal of the second plug, while the third contact point is connected to the third terminal of the second plug. The socket is for engaging with the first plug of the earphone-microphone set. When the first plug of the earphone-microphone set is connected to the socket, the first contact point of the socket is in contact with the first terminal of the first plug, the second contact point of the socket is in contact with the second terminal of the first plug and the third contact point of the socket is in contact with the third terminal of the first plug.

One end of the muting switch is connected to the first terminal of the second plug, while the other end of the muting switch is connected to the first contact point of the socket. After the earphone-microphone set is connected to the mobile telephone via the adapter, the muting switch is also hooked up to the mobile telephone. When the muting switch is activated, connection of the microphone to the mobile telephone is cut off.

One end of the call-receiving switch is connected to the first contact point of the socket, while the other end of the call-receiving switch is connected to the third contact point of the socket. After the earphone-microphone set is connected to the mobile telephone via the adapter, any incoming calls can be picked up by pressing the call-receiving switch briefly.

According to one embodiment of this invention, a protective device between the first contact point and the third contact point of the socket is also provided. The protective element is used for protecting the circuits within the mobile telephone against any damages due to external voltage surges. In general, the protective element can be a Zener diode whose positive terminal is connected to the first contact point of the socket, while the negative terminal is connected to the third contact point of the socket.

According to another embodiment of this invention, the muting switch includes a sliding switch. When the sliding switch is moved to one end, circuit connection is closed. On the other hand, when the sliding switch is moved back in an opposite direction, circuit connection is opened. Furthermore, the call-receiving switch includes a press-button switch. When the press-button switch is pressed down, the switch closes. However, when the button is relaxed, the switch opens again.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
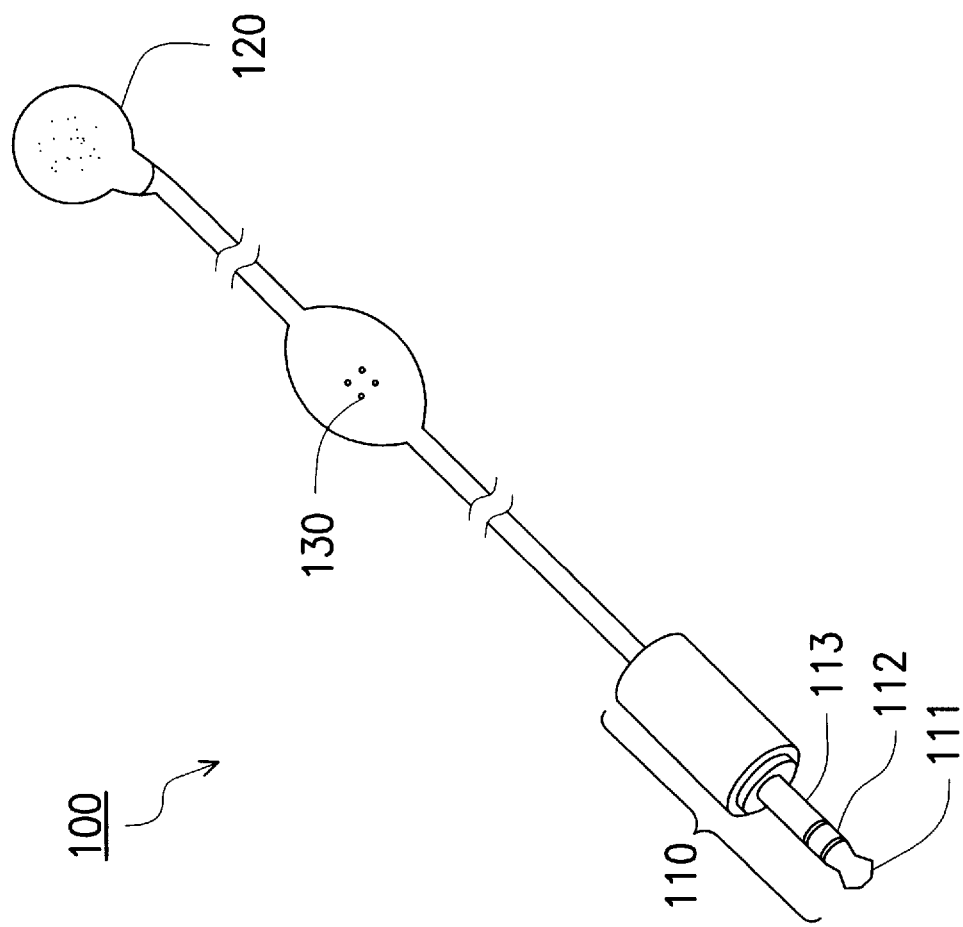
FIG. 1A is a schematic sketch of a conventional earphone-microphone set and a mobile telephone.
Figure 1A:
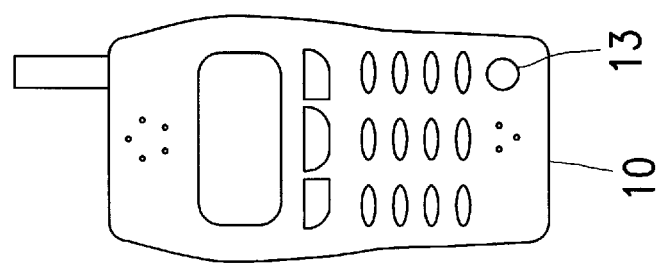
Figure 1B:
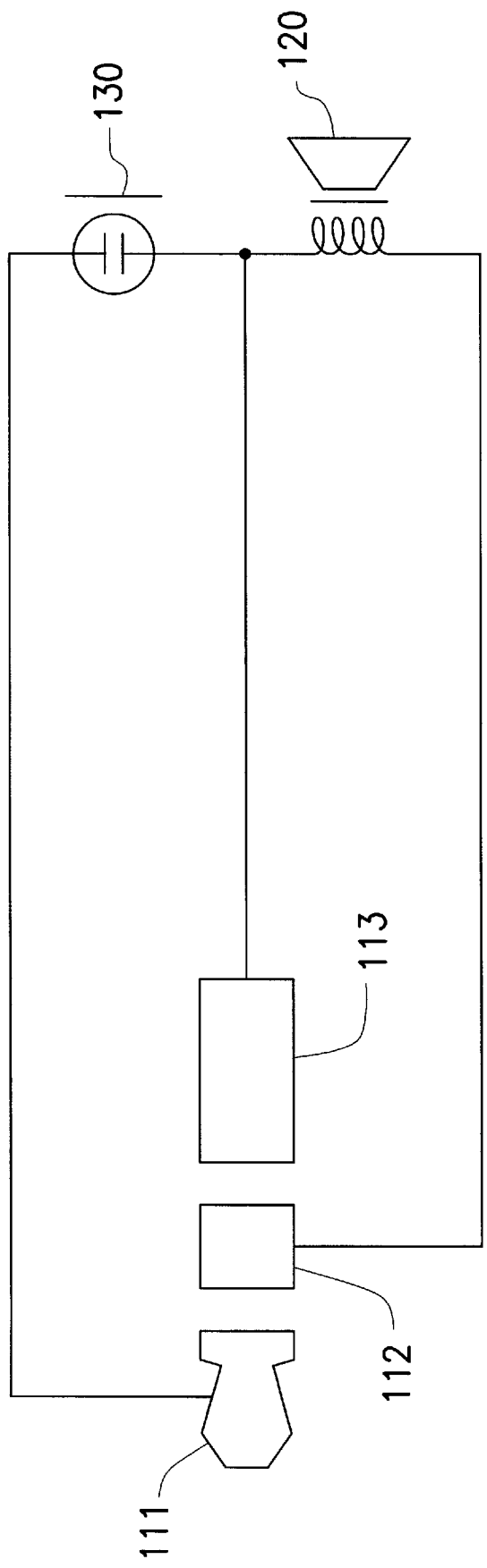
FIG. 1B is a circuit diagram showing the electrical connection within the earphone-microphone set as shown in FIG. 1A.
Figure 2A:
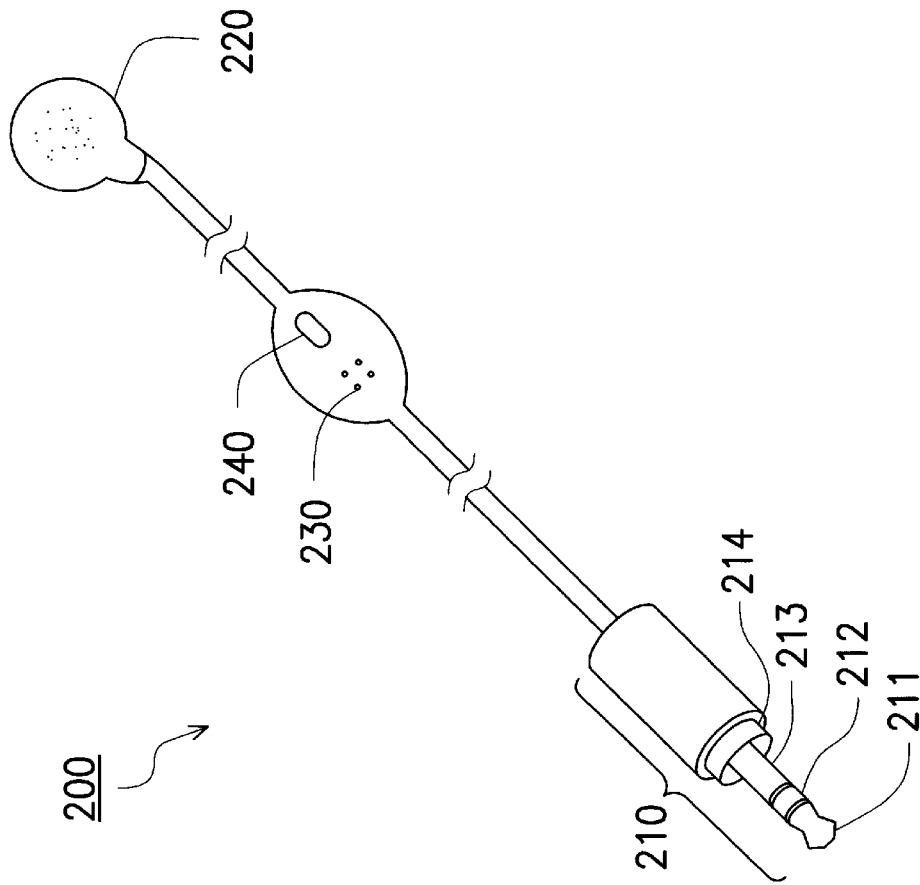
FIG. 2A is a schematic sketch of a newer version of conventional earphone-microphone set and a mobile telephone.
Figure 2A:
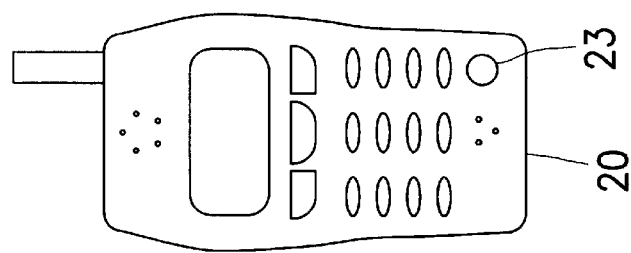
Figure 2B:
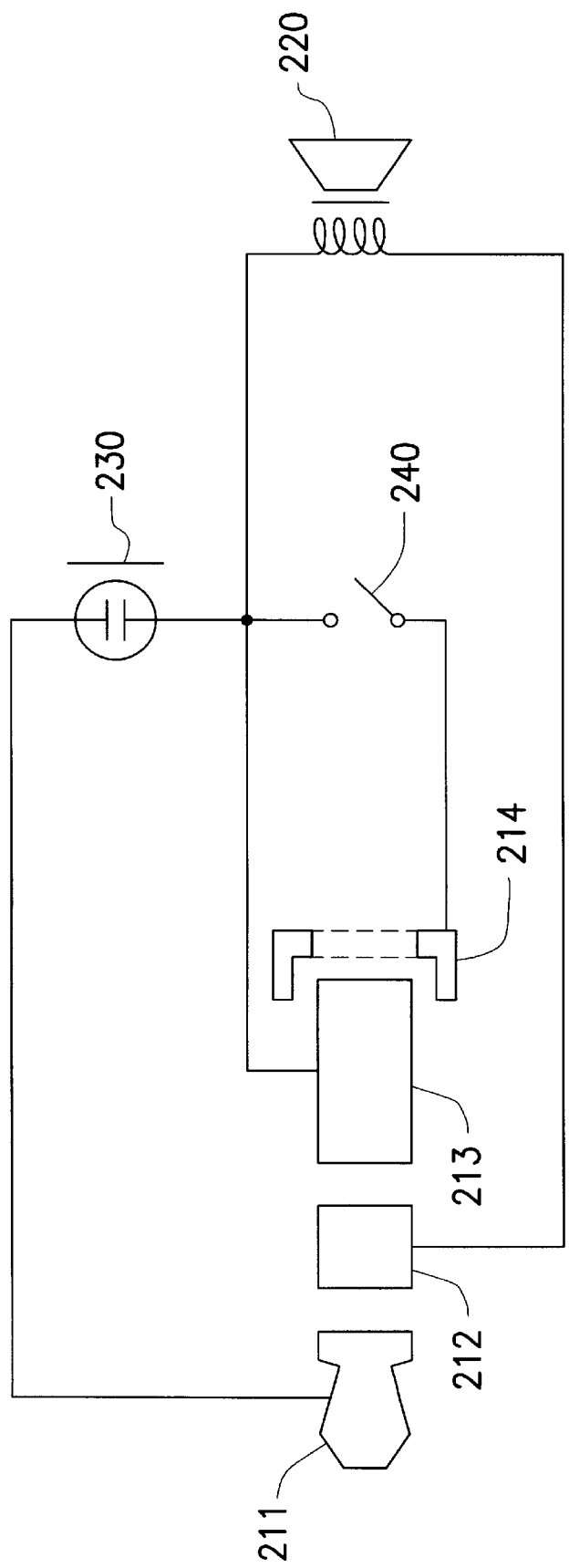
FIG. 2B is a circuit diagram showing the electrical connection within the earphone-microphone set as shown in FIG. 2A.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
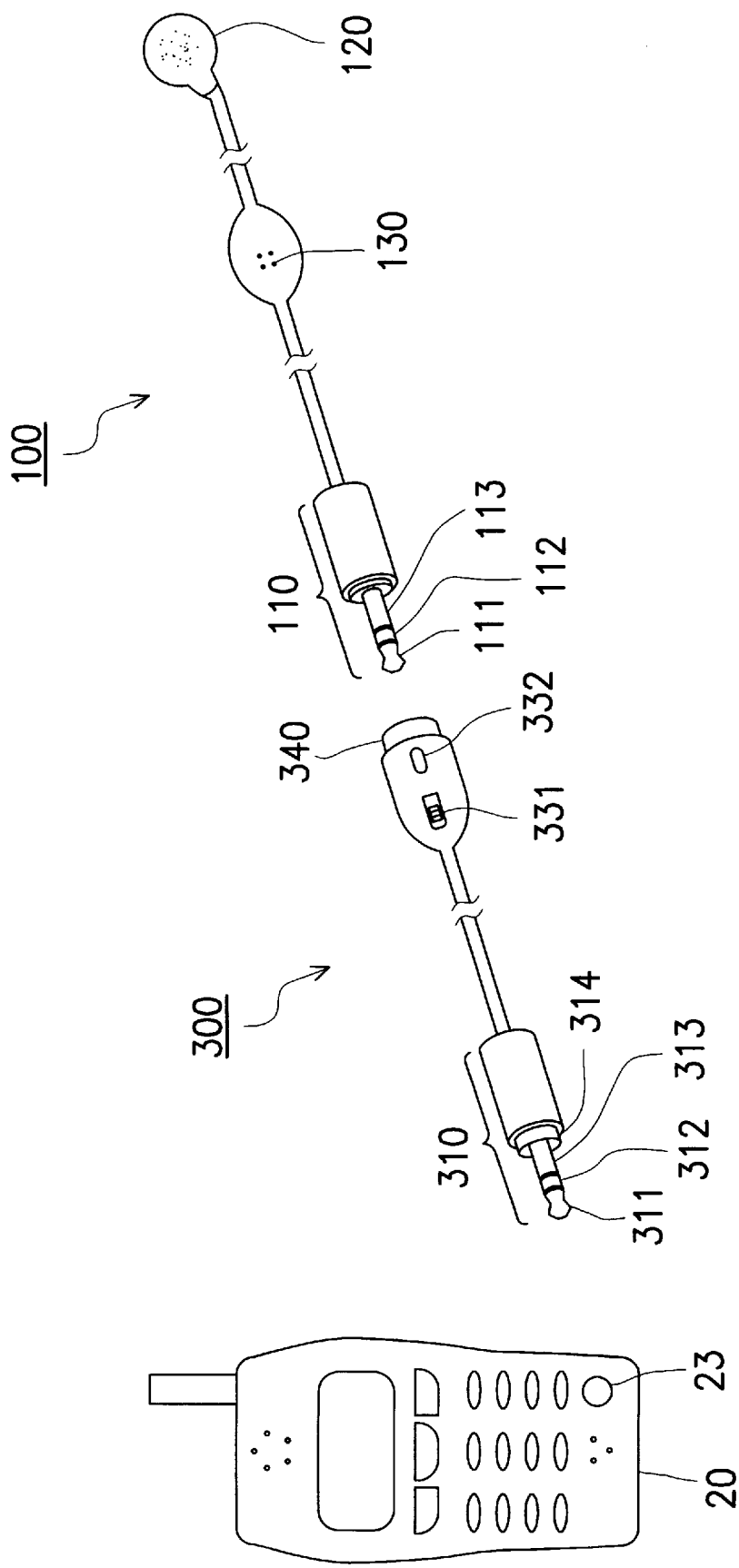
FIG. 3A is a schematic sketch of an earphone-microphone set, an adapter, and a mobile telephone system according to the first preferred embodiment of this invention.
Figure 3B:
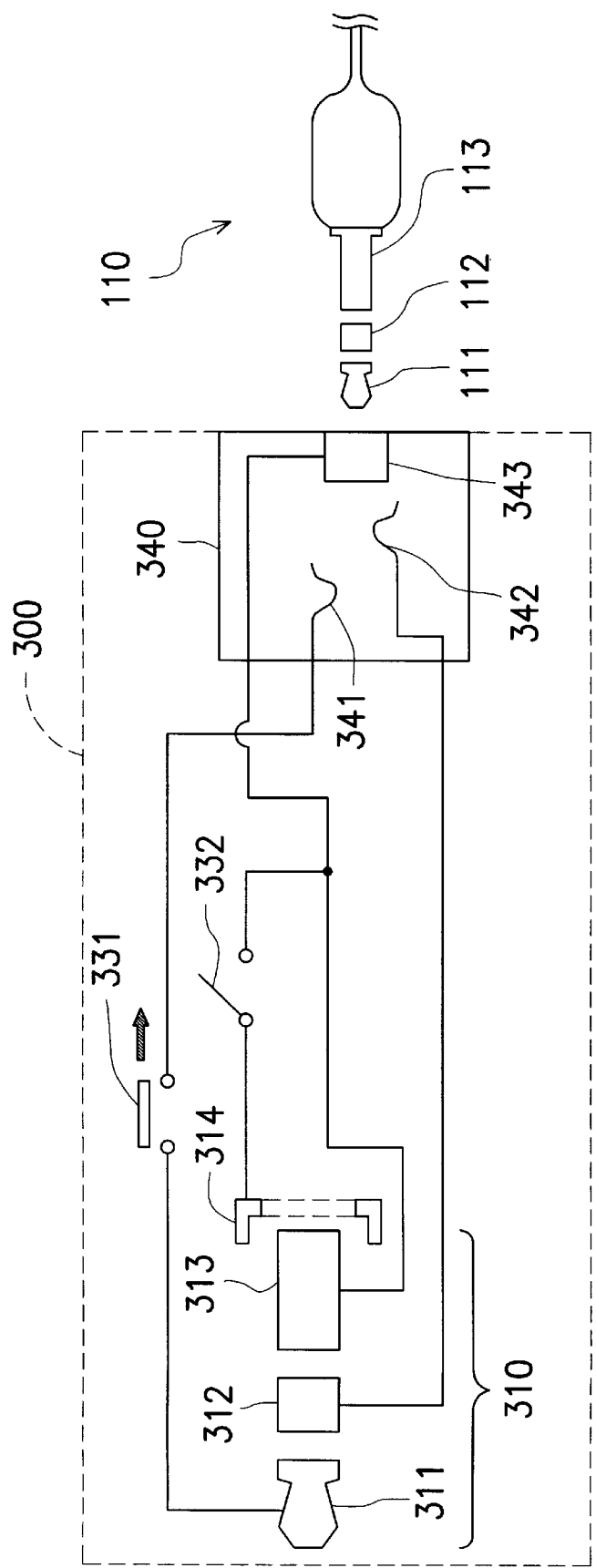
FIG. 3B is a circuit diagram showing the electrical connection within the adapter and associated plug of the earphone-microphone set as shown in FIG. 3A.

FIG. 3A is a sketch of an earphone-microphone set, an adapter, and a mobile telephone system according to the first preferred embodiment of this invention. FIG. 3B is a circuit diagram showing the electrical connection within the adapter and associated plug of the earphone-microphone set as shown in FIG. 3A.

As shown in FIGS. 3A and 3B, the adapter 300 is used for connecting the earphone-microphone set 100 to a mobile telephone 20 so that the earphone-microphone has both a call-receiving function and a muting function. The earphone-microphone set 100 comprises an earphone 120, a microphone 130 and a plug 110. The plug 110 has three terminals including terminals 111, 112 and 113. The two ends of the microphone 130 are connected to the respective terminals 111 and 113 of the plug 110, while the two ends of the earphone 120 are connected the respective terminals 112 and 113 of the plug 110.

The adapter 300 comprises a plug 310, a muting switch 331, a call-receiving switch 332 and a socket 340. The plug 310 has four terminals including terminal 311, 312, 313 and 314 for connecting to a four-terminal socket 23 of the mobile telephone 20. The mobile telephone 20 is a newer type capable of detecting a user's call receiving state and ascertaining whether or not the user has decided to pick up the call.

The socket 340 has three contact points, namely, contact points 341, 342, and 343. The socket 340 is made to accommodate the plug 110. When the plug 110 is plugged into the socket 340, various contact points of the socket 340 are in contact with the corresponding terminals of the plug 110. In other words, the contact point 341 is in contact with the terminal 111, the contact point 342 is in contact with the terminal 112, and the contact point 343 is in contact with the terminal 113.

The contact point 341 of the socket 340 is connected to the terminal 311 of the plug 310 through the muting switch 331. On the other hand, the contact point 342 of the socket 340 is directly connected to the terminal 312 of the plug 310. The contact point 343 is directly connected to the terminal 313 of the plug 310, as well. However, the terminal 313 of the plug 310 is connected to its terminal 314 via the call-receiving switch 332.

Switch 331 is a muting switch. When the earphone-microphone set 100 is connected to the mobile telephone 20 through the adapter 300, the muting switch 331 is also connected. Therefore, whenever the muting switch 331 is closed, the microphone 130 is connected to the mobile telephone 20. On the other hand, whenever the muting switch 331 is opened, connection of the microphone 130 to the mobile phone is cut off. Consequently, the user is free to talk to somebody nearby without having to worry about being overheard by someone on the telephone. Since the user normally requires the muting switch to be in either the open state or the close state, the muting switch 331 can be a sliding switch. For example, as shown in FIG. 3B, switch 331 cuts off connection with the microphone when it slides in the direction shown by the arrow. Alternatively, when the switch 331 slides back in the opposite direction, connection with the microphone is re-established.

Switch 332 is a call-receiving switch. Whenever the earphone-microphone set 100 is connected to the mobile telephone 20 via the adapter 300, the call-receiving switch 332 can be pressed briefly to pick up an incoming call. Since the mobile telephone 20 has internal circuitry for detecting transition of states between terminal 313 and terminal 314 of the plug 310, a press-button switch can be used. Hence, when the button of switch 332 is pressed, the switch conducts. On the other hand, when the button is released, an open-circuit state resumes.

Since the adapter 300 can act as a link between an earphone-microphone set 100 and a four-terminal socket of the mobile telephone 20, any older version of earphone-microphone set can still be used. Therefore, the convenience of having a muting switch 331 and a call-receiving switch 332 can be obtained without having to waste money on buying a brand new earphone-microphone set.

In FIGS. 3A and 3B, both muting switch 331 and call-receiving switch 332 are present in the adapter 300. In practice, only one of the two switches may be required. In that case, an adapter having only a muting switch 331 or an adapter having only a call-receiving switch 332 can be designed. For example, if only the muting switch 331 is required, the call-receiving switch 332 can be omitted and then an open circuit condition can be maintained between terminal 313 and 314 of the plug 310. Alternatively, if only the call-receiving switch 332 is required, the muting switch 331 can be replaced by direct wiring so that the contact point 341 of the socket 340 is directly connected to the terminal 331 of the plug 310.

Figure 4A:
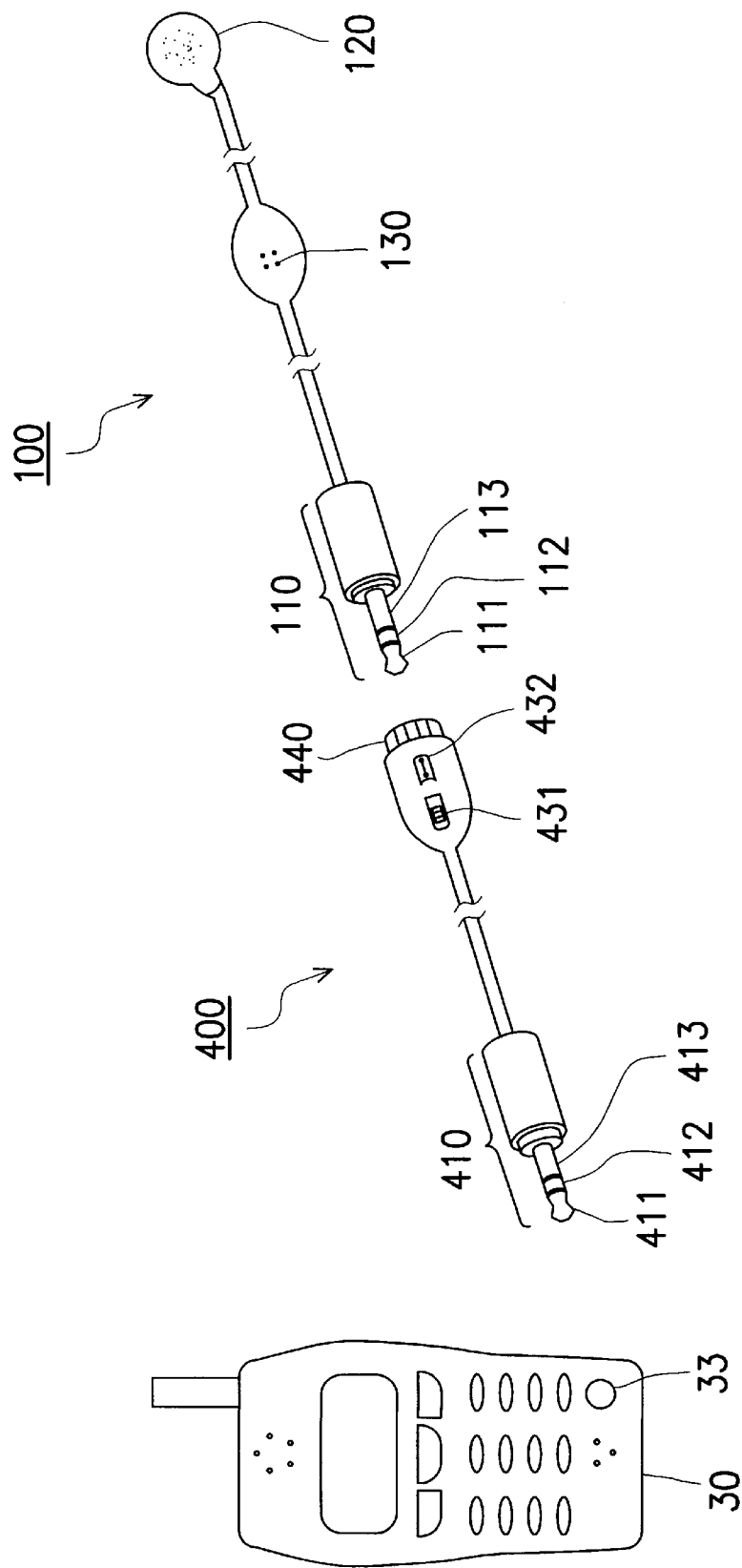
FIG. 4A is a schematic sketch of an earphone-microphone set, an adapter, and a mobile telephone system according to the second preferred embodiment of this invention.
Figure 4B:
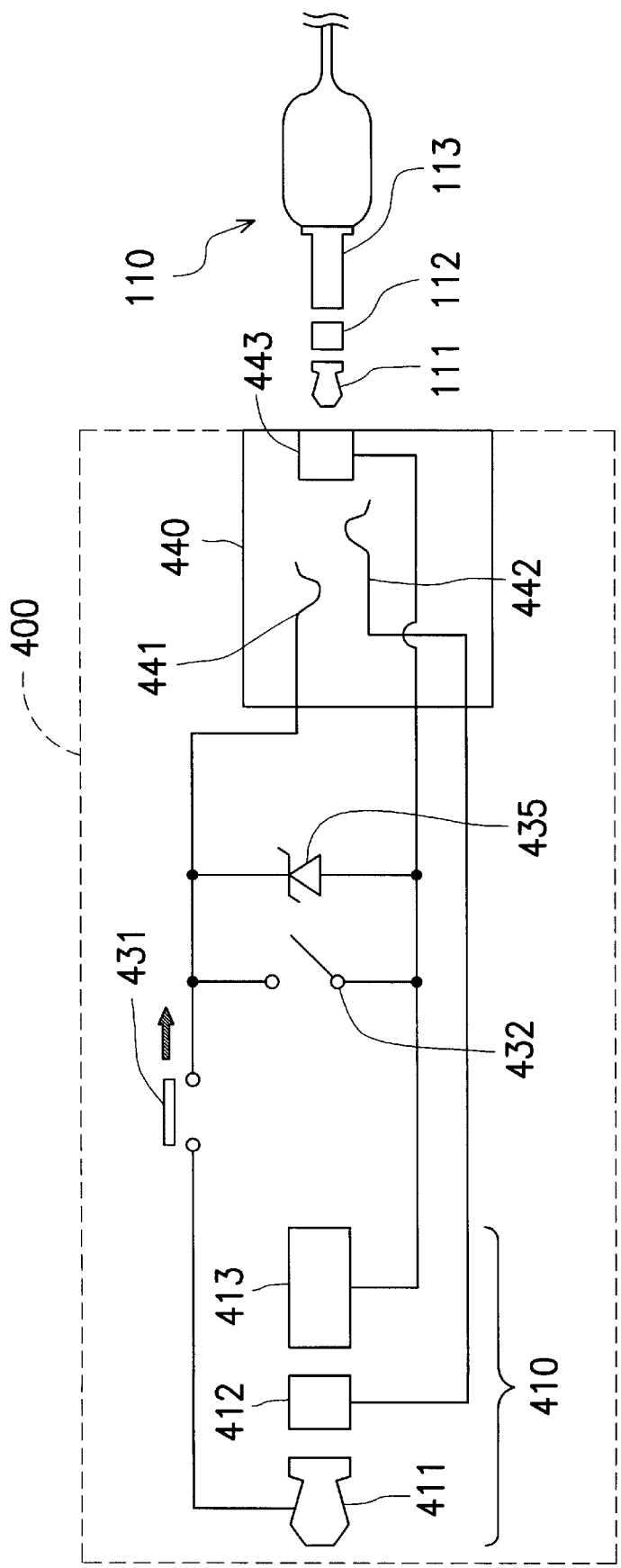
FIG. 4B is a circuit diagram showing the electrical connection within the adapter and associated plug of the earphone-microphone set as shown in FIG. 4A.

FIG. 4A is a sketch of an earphone-microphone set, an adapter, and a mobile telephone system according to the second preferred embodiment of this invention. FIG. 4B is a circuit diagram showing the electrical connection within the adapter and associated plug of the earphone-microphone set as shown in FIG. 4A.

As shown in FIGS. 4A and 4B, the adapter 400 is used for connecting the earphone-microphone set 100 to a mobile telephone 30 so that the earphone-microphone has both call receiving and muting functions. The earphone-microphone set 100 comprises an earphone 120, a microphone 130 and a plug 110. The plug 110 has three terminals including terminals 111, 112 and 113. The two ends of the microphone 130 are connected to the respective terminals 111 and 113 of the plug 110, while the two ends of the earphone 120 are connected the respective terminals 112 and 113 of the plug 110.

The adapter 400 comprises a plug 410, a muting switch 431, a call-receiving switch 432, a protection element 435 and a socket 440. The plug 410 has terminals 411, 412, and 413 for connecting to a three-terminal socket 33 of the mobile telephone 30. The mobile telephone 30 is another type of telephone capable of detecting a user's call receiving state and ascertaining whether or not the user has indeed picked up the incoming call. The method of detecting incoming calls will be subsequently explained together with the working of the call-receiving switch 432.

The socket 440 has three contact points, namely, contact points 441, 442, and 443. The socket 440 is made to accommodate the plug 110. When the plug 110 is plugged into the socket 440, various contact points of the socket 440 are in contact with the corresponding terminals of the plug 110. In other words, contact point 441 is in contact with the terminal 111, the contact point 442 is in contact with the terminal 112, and the contact point 443 is in contact with the terminal 113.

The contact point 441 of the socket 440 is connected to the terminal 411 of the plug 410 through the muting switch 431. On the other hand, the contact point 442 of the socket 440 is directly connected to the terminal 412 of the plug 410. The contact point 443 of the socket 440 is directly connected to the terminal 413 of the plug 410 as well. However, the call-receiving switch 432 is connected between terminal 441 and terminal 443 of the socket 440. Furthermore, a protection element 435 is also installed in parallel between terminal 441 and terminal 443 of the socket 440. The protection element 435 is a device for preventing any damage to internal circuitry of the mobile telephone 30 when a voltage surge is generated by flipping the switch 432.

In general, the protection element 432 can be a Zener diode. When a Zener diode is used as the protection element 432, the positive terminal of the Zener diode is connected to the contact point 441 of the socket 440. The negative terminal of the Zener diode is connected to the contact point 443 of the socket 440 because the contact point 443 is usually connected to a ground circuit.

Switch 431 is a muting switch. When the earphone-microphone set 100 is connected to the mobile telephone 30 through the adapter 400, the muting switch 431 is also connected. Therefore, whenever the muting switch 431 is closed, the microphone 130 is connected to the mobile telephone 30. On the other hand, whenever the muting switch 431 is opened, connection of the microphone 130 to the mobile phone is cut off. Consequently, the user is free to talk to somebody nearby without having to worry about being overheard by someone on the telephone. Since the user normally requires the muting switch to be in either the open state or the close state, the muting switch 431 can be a sliding switch. For example, as shown in FIG. 4B, switch 431 cuts off connection with the microphone when it slides in the direction shown by the arrow. Alternatively, when the switch 431 slides back in the opposite direction, connection with the microphone is re-established.

Switch 432 is a call-receiving switch. Whenever the earphone-microphone set 100 is connected to the mobile telephone 30 via the adapter 400, the call-receiving switch 432 can be pressed briefly to pick up an incoming call. The two ends of the call-receiving switch 432 are connected to respective contact point 441 and contact point 443 of the socket 440. In other words, the call-receiving switch 432 is connected in parallel with the microphone 130. When the microphone 130 receives external audio signals, the variation of reactance at its two terminals is rather small.

However, the call-receiving switch 432 forces the two terminals into a short-circuiting or an open-circuiting condition. In other words, when the call-receiving switch is flipped, the reactance between the two terminals changes from zero to infinity or vice versa. Consequently, by detecting the change in potential at these two ends, the mobile telephone 30 is able to detect whether the user has flipped the call-receiving switch 432 or not. Moreover, by connecting the call-receiving switch 432 and the microphone in parallel, the aforementioned mobile telephone 20 having a four-terminal socket is not necessary. A mobile telephone having only a three-terminal socket is feasible too. Hence, a plug 410 having only three terminals can be used in this embodiment. Since the mobile telephone 30 has internal circuitry for detecting transition of states between terminal 313 and terminal 314 of the plug 310, a press-button switch can be used. When the button of switch 332 is pressed, the switch conducts. On the other hand, when the button is released, open-circuit resumes.

Since the adapter 400 can act as a link between an earphone-microphone set 100 and a three-terminal socket of the mobile telephone 30, any older version of earphone-microphone set can still be used. Therefore, the convenience of having a muting switch 431 and a call-receiving switch 432 can be obtained without having to waste money on buying a brand new earphone-microphone set.

In FIGS. 4A and 4B, both muting switch 431 and call-receiving switch 432 are present in the adapter 400. In practice, only one of the two switches may be required. In that case, an adapter having only a muting switch 431 or an adapter having only a call-receiving switch 432 can be designed. For example, if only the muting switch 431 is required, the call-receiving switch 432 can be omitted. Alternatively, if only the call-receiving switch 432 is required, the muting switch 331 can be replaced by direct wiring so that the contact point 441 of the socket 440 is directly connected to the terminal 411 of the plug 410.

In summary, the adapter of this invention in combination with a conventional earphone-microphone set has the following advantages:

1. A muting function is provided so that the microphone can be cut off when the muting switch is flipped. Hence, users can freely talk with another person without having to worry about being overheard by someone on the telephone line.
2. Old earphone-microphone set can be used by plugging an old set into the adapter. There is no need to purchase a new earphone-microphone set, thereby saving money and resources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An adapter for linking an earphone-microphone set to a mobile telephone, wherein the earphone-microphone set includes an earphone, a microphone and a first plug such that the first plug includes a first terminal, a second terminal and a third terminal, one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, a third terminal and a fourth terminal for connecting with the mobile telephone;

a socket having a first contact point, a second contact point and a third contact point, wherein the second contact point is connected to the second terminal of the second plug, the third contact point is connected to the third terminal of the second plug, and the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug;

a muting switch having one end connected to the first terminal of the second plug while the other end is connected to the first contact point of the socket, such that when the earphone-microphone set is connected to the mobile telephone via the adapter, closing the muting switch connects the microphone to the mobile telephone while opening the muting switch cuts off the connection of microphone to the telephone; and a call-receiving switch having one end connected to the third terminal of the second plug while the other end is connected to the fourth terminal of the second plug, such that when the earphone-microphone set is connected to the mobile telephone via the adapter, activating the call-receiving switch briefly enables a user to pick up an incoming call.

2. The adapter of claim 1, wherein the muting switch includes a sliding switch such that connection is established when the sliding switch is moved sideways in a first direction, and the connection is cut off when the sliding switch is moved back to its original position.

3. The adapter of claim 1, wherein the call-receiving switch includes a press-button switch such that connection is established when the button is pressed, and the connection is cut off when the button is released.

4. An adapter for linking an earphone-microphone set to a mobile telephone, the earphone-microphone set including an earphone, a microphone and a first plug, wherein the first plug includes a first terminal, a second terminal and a third terminal, t one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, and a third terminal for connecting with the mobile telephone;

a socket having a first contact point, a second contact point and a third contact point such that the second contact point is connected to the second terminal of the second plug, the third contact point is connected to the third terminal of the second plug, and that the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug;

a muting switch having one end connected to the first terminal of the second plug while the other end is connected to the first contact point of the socket, and when the earphone-microphone set is connected to the mobile telephone via the adapter, closing the muting switch connects the microphone to the mobile telephone while opening the muting switch cuts off the connection of the microphone to the telephone; and a call-receiving switch having one end connected to the first contact point of the socket while the other end is connected to the third contact point of the socket, and incoming calls can be received by briefly engaging the call-receiving switch.

5. The adapter of claim 4, wherein the adapter further includes a protection element having one end connected to the first contact point of the socket while the other end is connected to the third contact point of the socket so as to prevent any damage to the internal circuit of the mobile telephone due to voltage surges.

6. The adapter of claim 5, wherein the protective element includes a Zener diode whose positive terminal is connected to the first contact point of the socket and whose negative terminal is connected to the third contact point of the socket.

7. The adapter of claim 4, wherein the muting switch includes a sliding switch such that connection is established when the sliding switch is moved sideways in a first direction, and the connection is cut off when the sliding switch is moved back to its original position.

8. The adapter of claim 4, wherein the call-receiving switch includes a press-button switch such that connection is established when the button is pressed, and connection is cut off when the button is released.

9. An adapter for linking an earphone-microphone set to a mobile telephone, wherein the earphone-microphone set includes an earphone, a microphone and a first plug such that the first plug includes a first terminal, a second terminal and a third terminal, one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, a third terminal and a fourth terminal for connecting with the mobile telephone;

a socket having a first contact point, a second contact point and a third contact point such that the second contact point is connected to the second terminal of the second plug, the third contact point is connected to the third terminal of the second plug, and the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug; and a muting switch having one end connected to the first terminal of the second plug while the other end is connected to the first contact point of the socket, and when the earphone-microphone set is connected to the mobile telephone via the adapter, closing the muting switch connects the microphone to the mobile telephone while opening the muting switch cuts off the connection of microphone to the telephone.

10. The adapter of claim 9, wherein the muting switch includes a sliding switch such that connection is established when the sliding switch is moved sideways in a first direction, and the connection is cut off when the sliding switch is moved back to its original position.

11. An adapter for linking an earphone-microphone set to a mobile telephone, wherein the earphone-microphone set includes an earphone, a microphone and a first plug such that the first plug includes a first terminal, a second terminal and a third terminal, one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, a third terminal and a fourth terminal for connecting with the mobile telephone;

a socket having a first contact point, a second contact point and a third contact point such that the second contact point is connected to the second terminal of the second plug, the third contact point is connected to the third terminal of the second plug, and the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug; and a call-receiving switch having one end connected to the third terminal of the second plug while the other end is connected to the fourth terminal of the second plug, and when the earphone-microphone set is connected to the mobile telephone via the adapter, activating the call-receiving switch briefly enables a user to pick up an incoming call.

12. The adapter of claim 11, wherein the call-receiving switch includes a press-button switch such that connection is established when the button is pressed, and the connection is cut off when the button is released.

13. An adapter for linking an earphone-microphone set to a mobile telephone, wherein the earphone-microphone set includes an earphone, a microphone and a first plug such that the first plug includes a first terminal, a second terminal and a third terminal, one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, and a third terminal for connecting with the mobile telephone;

a socket having a first contact point, a second contact point and a third contact point such that the second contact point is connected to the second terminal of the second plug, the third contact point is connected to the third terminal of the second plug, and the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug; and a muting switch having one end connected to the first terminal of the second plug while the other end is connected to the first contact point of the socket, and when the earphone-microphone set is connected to the mobile telephone via the adapter, closing the muting switch connects the microphone to the mobile telephone while opening the muting switch cuts off the connection of microphone to the telephone.

14. The adapter of claim 13, wherein the muting switch includes a sliding switch such that connection is established the sliding switch is moved sideways in a first direction, and the connection is cut off when the sliding switch is moved back to its original position.

15. An adapter for linking an earphone-microphone set to a mobile telephone, wherein the earphone-microphone set includes an earphone, a microphone and a first plug such that the first plug includes a first terminal, a second terminal and a third terminal, one end of the microphone is connected to the first terminal of the first plug while the other end of the microphone is connected to the third terminal of the first plug, and one end of the earphone is connected to the second terminal of the first plug while the other end of the earphone is connected to the third terminal of the first plug, the adapter comprising:

a second plug having a first terminal, a second terminal, and a third terminal for connecting with the mobile telephone;

a socket having a first contact point, a second contact point and a third contact point such that the second contact point is connected to the second terminal of the second plug, the third contact point is connected to the third terminal of the second plug, and the socket is used for receiving the first plug of the earphone-microphone set such that when the first plug is plugged into the socket, the first contact point of the socket contacts the first terminal of the first plug, the second contact point of the socket contacts the second terminal of the first plug, and the third contact point of the socket contacts the third terminal of the first plug; and a call-receiving switch having one end connected to first contact point of the socket while the other end connected to the third contact point of the socket, and an incoming call can be received by briefly engaging the call-receiving switch.

16. The adapter of claim 15, wherein the adapter further includes a protection element having one end connected to the first contact point of the socket while the other end connected to the third contact point of the socket so as to prevent any damage to the internal circuitry of the mobile telephone due to voltage surges.

17. The adapter of claim 16, wherein the protective element includes a Zener diode whose positive terminal is connected to the first contact point of the socket and the negative terminal is connected to the third contact point of the socket.

18. The adapter of claim 15, wherein the call-receiving switch includes a press-button switch such that connection is established when the button is pressed, and the connection is cut off when the button is released.

* * * * *